United States Patent [19]
Seo et al.

[11] Patent Number: 6,044,423
[45] Date of Patent: Mar. 28, 2000

[54] IDENTIFICATION OF A SWAPPABLE DEVICE IN A PORTABLE COMPUTER

[75] Inventors: Seung-Won Seo, Kyunggi-do; Sung-Ho Jung, Seoul, both of Rep. of Korea

[73] Assignee: SamSung Electronics Co., Ltd., Kyungki-do, Rep. of Korea

[21] Appl. No.: 08/958,257

[22] Filed: Oct. 27, 1997

[30] Foreign Application Priority Data

Nov. 13, 1996 [KR] Rep. of Korea ..................... 96-53778

[51] Int. Cl.[7] .................................................. G06F 13/00
[52] U.S. Cl. ............................ 710/103; 710/10; 710/19; 710/104
[58] Field of Search .................................... 395/283, 564, 395/651; 710/1–4, 8–11, 15–19, 62–64, 101–104, 129–131, 72–74

[56] References Cited

U.S. PATENT DOCUMENTS

| | | | |
|---|---|---|---|
| 5,408,669 | 4/1995 | Stewart et al. | |
| 5,428,748 | 6/1995 | Davidson et al. | |
| 5,517,646 | 5/1996 | Piccirillo et al. | 395/651 |
| 5,553,245 | 9/1996 | Su et al. | |
| 5,559,965 | 9/1996 | Oztaskin et al. | 395/284 |
| 5,561,727 | 10/1996 | Akita et al. | 385/88 |
| 5,581,712 | 12/1996 | Hermann | 395/283 |
| 5,594,874 | 1/1997 | Narayanan et al. | 395/284 |
| 5,630,174 | 5/1997 | Stone, III et al. | |
| 5,634,075 | 5/1997 | Smith et al. | 395/829 |
| 5,671,368 | 9/1997 | Chan et al. | 710/102 |
| 5,768,542 | 6/1998 | Enstrom et al. | 395/284 |
| 5,768,568 | 6/1998 | Inui et al. | 395/500 |
| 5,781,744 | 7/1998 | Johnson et al. | 395/283 |
| 5,781,798 | 7/1998 | Beatty et al. | 710/10 |
| 5,805,834 | 9/1998 | McKinley et al. | 395/283 |
| 5,901,292 | 5/1999 | Nishigaki et al. | 710/103 |
| 5,909,596 | 6/1999 | Mizuta | 710/63 |
| 5,918,028 | 6/1999 | Silverthorn et al. | 710/109 |
| 5,922,060 | 7/1999 | Goodrum | 710/103 |
| 5,958,056 | 9/1999 | Lehmann | 710/310 |

OTHER PUBLICATIONS

Plug and Play ISA Specification, Version 1.0a, May 5, 1994.

*Primary Examiner*—Christopher B. Shin
*Attorney, Agent, or Firm*—Robert E. Bushnell, Esq.

[57] ABSTRACT

An identification system for use in a portable computer incorporating optional swappable devices through one swap bay is disclosed. The identification system includes an ID provider provided at each of the swappable device for providing specific device information with the portable computer through an I/O port. The device information includes for example an identification number representing the kind of the peripheral device, a CD-ROM speed data, a storage capacity data, and a manufacturer data. This information is stored in a memory such as an EEPROM and the data is transferred serially to the computer system in response to a command generated in the computer. The identification system further includes a ROM BIOS for reading out the device information from the swappable device to perform initialization therefor based on the device information when the computer is started or a swap check request signal is invoked during operation of the computer. With this, the identification system provides for the detailed and precise device information whenever the computer system is booted or the swappable device has changed during the operation of the computer. Thus, preventing time loss for individual checking for all swappable devices during the booting is possible. Further, misconceptions of the module in the portable computer can be effectively prevented.

21 Claims, 6 Drawing Sheets

IDENTIFICATION OF A SWAPPABLE DEVICE IN A PORTABLE COMPUTER

CLAIM OF PRIORITY

This application makes reference to, incorporates the same herein, and claims all benefits accruing under 35 U.S.C. §119 from an application for IDENTIFICATION OF MODULAR DEVICE IN A PORTABLE COMPUTER earlier filed in the Korean Industrial Property Office on the 13$^{th}$ of November 1996 and there duly assigned Ser. No. 53778/1996.

FIELD OF THE INVENTION

The present invention relates to portable computers, and more particularly to an identification system of swappable devices mounted to a swap bay of the portable computer.

DESCRIPTION OF THE RELATED ART

Portable or notebook computers have become a popular alternative to traditional desktop computers in terms of movability, simplicity, and various functions. A known problem, however, is difficulty in providing versatility due to smaller size. Smaller size naturally means less space to provide abroad choice in peripheral devices and options. U S. Pat. No 5,553,245 for an Automatic Configuration of Multiple Peripheral Interface Subsystems in a Computer System to Su et al and U.S. Pat. No. 5,428,748 for a Method and Apparatus for Automatically Configuring a Computer Peripheral to Davidson et al disclose configurations of computer peripherals. Advantageously, plug-in type modules have been provided for such as floppy disk drives, CD-ROM drives, and hard disk drives alternatively to dock in a swap bay of the portable computer. There are power modules for providing battery power, and more than one power module may be used to provide extended operating time. Also, provided is a docking station that incorporates necessary expansion devices such as CD-ROM drives, external speakers, and extra batteries into a housing to enhance expandability of the portable computer. I have found that the art fails to provide either a method or an apparatus for identifying a computer peripheral to the host portable computer in a swappable system.

SUMMARY OF THE INVENTION

It is therefore an object of the present invention to provide an improved portable computer.

It is another object to provide a new identification system for the swappable devices serving as peripheral components in a portable computer, in which more detailed device information can be provided and the misidentification of a module is prevented when the module is changed during the operation of the portable computer.

These and other objects may be attained with a device identification system that uses an ID provider provided at each of the swappable device interfaces for providing specific device information to the portable computer through an I/O port; and a ROM BIOS for reading out the device information from the swappable device to perform initialization therefor based on the device information when the computer is started or a swap check request signal is invoked during operation of the computer.

The device information may include an identification number representing the kind of the peripheral device, a speed data of the CD-ROM, a storage capacity data, and a manufacturer data.

In one preferred form, the ID provider includes a memory coupled with a buffer and a chip select circuitry to transfer the information data to the computer system, and wherein the information data is outputted serially from the buffer in response to the chip select signal provided from the computer. Further, the memory includes an EEPROM.

In another preferred form, the ID provider includes a switch array which selectively outputs digital "1" or "0" voltage level, an inter-integrated circuits serial interface connected with the outputs of the switches, and an interrupt signal receiving means for enabling the serial interface to output serial data of the switches in response to the interrupt signals fed from the computer. The combinational output of digital data constitutes the device information which includes the device identification number, the speed of CD-ROM drive, the storage capacity, and the manufacturer. The switch uses a plurality of slide switches each having movable contacts manually switchable to an operating voltage Vcc or ground.

According to another aspect of this invention, there is provided a method for identifying swappable devices incorporating with a portable computer through one swap bay, the device identification method comprises the steps of checking the swap bay whether a swappable device is docked in the swap bay when the power-on self test operation is finished; generating a read-out command from the memory of the swappable device and reading out the device information data stored in the memory; determining the swappable device to perform device initialization routines based on the information; and transferring the bay state information to the operating system.

According to yet another aspect of this invention, optical connectors, instead of electrical contacts, are used to communicate between the portable computer and the swappable devices.

Advantageously, the identification system of the present invention provides detailed and precise information for driving the swappable device whenever the computer system is booted or the swappable device has changed during the operation of the computer. This will prevent time loss for individual checking for all swappable devices during the booting. Further, problems of the module in the portable computer can be effectively prevented.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
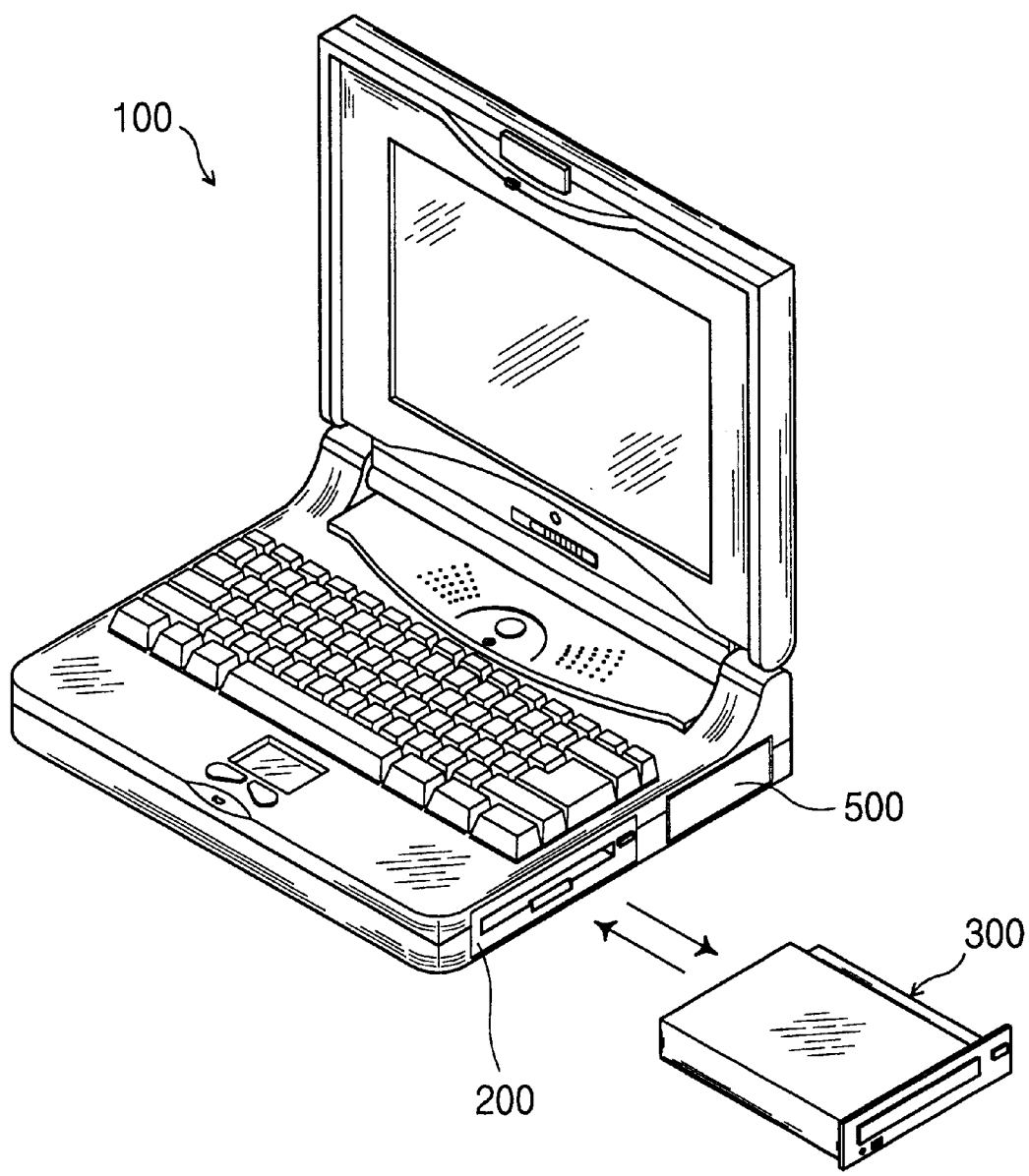
FIG. 1 is an illustration showing a portable computer incorporating exchangeable swappable devices.

FIG. 1 shows a portable computer, incorporating plug-in type functional modules. A floppy disk drive pack 200, for example, may be inserted into a swap bay of the portable computer 100 and another peripheral device such as a CD-ROM drive pack 300 is prepared for changing with the floppy disk drive pack 200. Reference number 500 denotes PCMCIA card slots. The drive pack 200 or 300 has at rear sides thereof a connector (210 or 310) to be coupled with a connector 160 provided inside the swap bay. When desired drive pack is docked, the portable computer may recognize the peripheral device in order properly to set the corresponding device driver.

Figure 2:
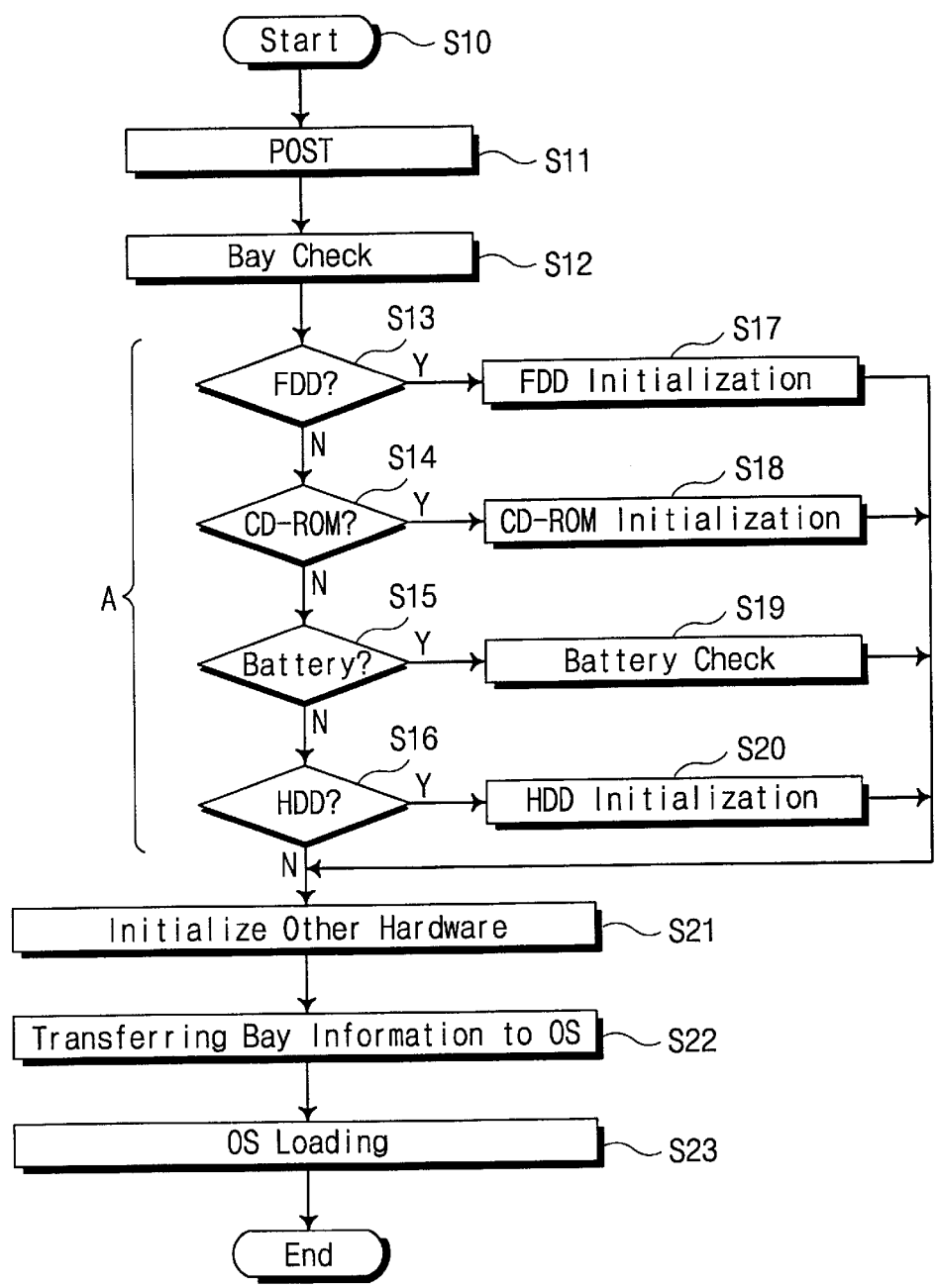
FIG. 2 is a flow diagram depicting a swap identification process used in a portable computer.

During the booting process, the system BIOS performs the device initialization routine in accordance with the device identification signal provided by the swappable device. More specifically, as shown in FIG. 2, the identification of the module comprises the bay checking process (step 12) in the middle of a POST (Power-On Self Test) operation (step 11). The POST operation is a set of routines stored in a computer's read-only memory (ROM) that tests various system components such as the module bay (step 12) and the disk drives, the CD-ROM, and battery (steps 13 through 16) to see if they are properly connected and operating. If the POST is successful, it passes control to the system BIOS. Then, a series of determinations are made whether the device identification signal corresponds to pre-set values designated to an optional module (steps 13 through 16). If the device identification signal corresponds to one of the module, it proceeds to the corresponding device initialization step (steps 17 through 20). After completion of the initialization step, the BIOS performs other hardware initialization operations for the portable computer during step 21, the BIOS then transfers the bay information to an operating system at step 22, and loading of the operating system onto the system main memory is performed at step 23.

Figure 3:
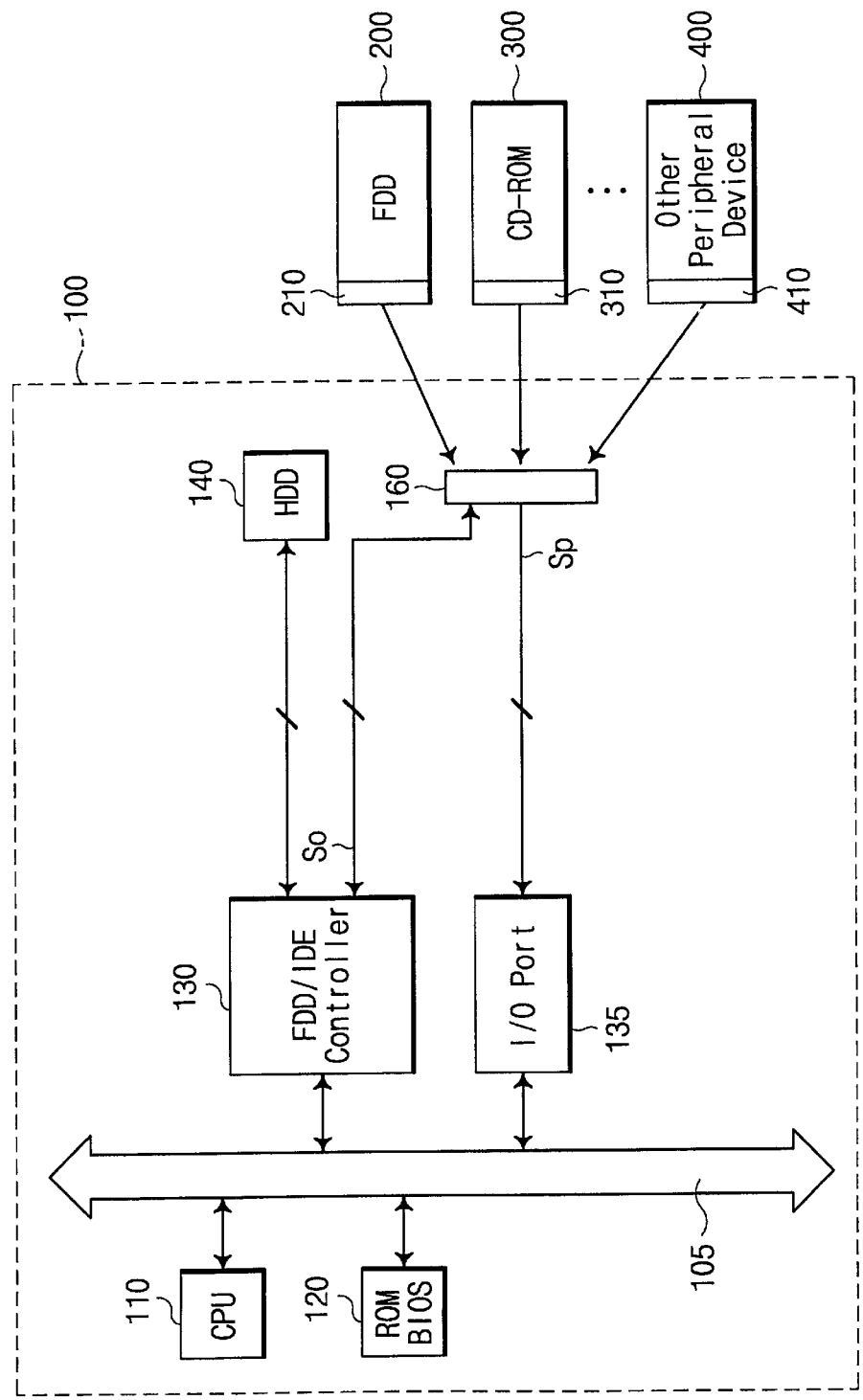
FIG. 3 is a block diagram of an identification system of the swappable device in accordance with the present invention.

This identification method, however, has drawbacks of time loss for checking modules and for the necessary device initialization during the booting process denoted by "A" in FIG. 3. Also, as the device identification signal is formed by a few digital bits, it is liable to be misconceived by the computer system when the swap is changed at a suspend/resume state as well as at an operating state of the portable computer. The incorrect resource data results in a malfunction of the computer system.

Referring to FIG. 3, there is shown an identification system of the swappable device adopted in a portable computer in accordance with the present invention. The swappable device includes a floppy disk drive, a CD-ROM drive, and other peripheral device such as extra hard disk drive and digital video disk (DVD) drive, and each device has same dimensions to be inserted in a swap bay of the portable computer alternatively. Also, the device has a connector to be coupled with a connector provided in a swap bay of the portable computer. A connector 160 is provided in the swap bay of portable computer 100, and connectors 210, 310, and 410 are fitted on corresponding exterior surfaces of peripheral devices 200, 300 and 400.

The connector 160 has signal lines $S_0$ which are led to a floppy disk drive integrated device electronics (FDD/IDE) controller 130 to communicate control and data signals with the swappable device. Further, the connector 160 includes signal lines $S_p$ that lead to an I/O port 135 to transfer a device identification signal to the computer system via a bus 105. Those signal lines $S_0$ and $S_p$ are connected through the connector 160 and one of connectors 210, 310, and 410 with interface boards of the peripheral devices 200, 300 and 400, respectively. In one embodiment, the connections may be electrical contacts with connector 160 and in another embodiment, they may be optical connectors with connector 160.

Figure 4:
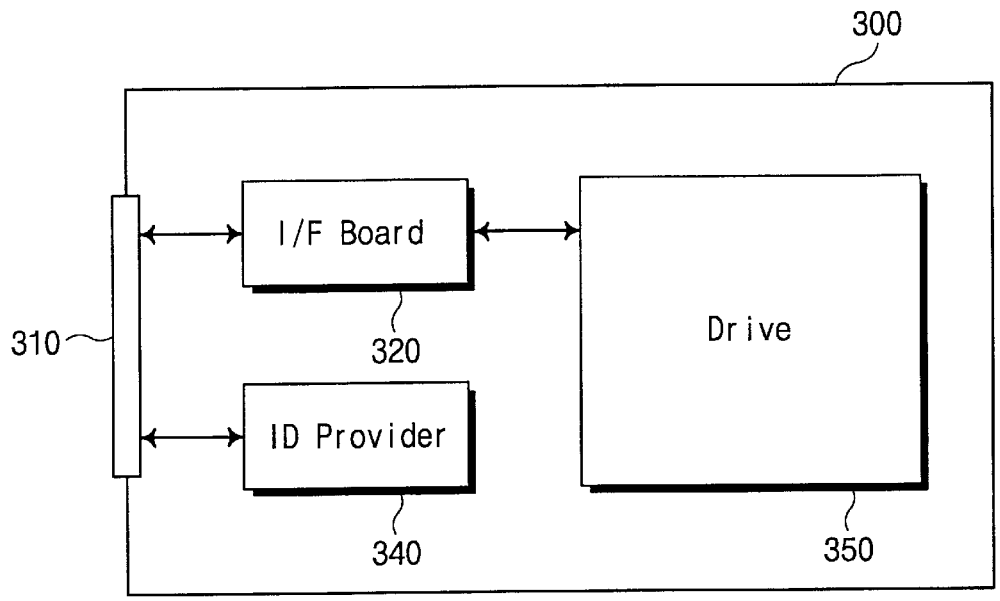
FIG. 4 is a block diagram of a swap having an ID information provider in accordance with the present invention.
Figure 5:
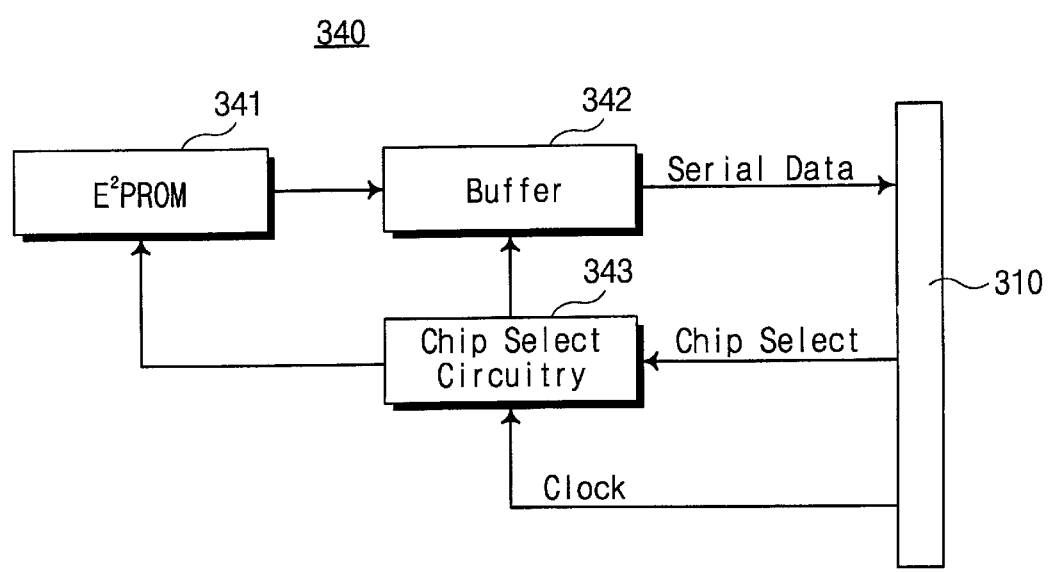
FIG. 5 is a block diagram of an embodiment of the ID information provider shown in FIG. 4.

As shown in FIG. 4, the swappable device, for example CD-ROM drive 300 has an interface board 320 and an identification information provider (hereinafter "ID provider") 340 connected with the connector 310. The interface board 320 is coupled with the CD-ROM driving part 350. Referring to FIG. 5, there is shown one embodiment of the ID provider 340. The ID provider 340 includes a memory 341 which stores an information related to the CD-ROM drive. Preferably, the memory 341 includes an EEPROM device and the information stored therein includes for example the device identification number representing the CD-ROM drive, the speed data, and the manufacturer. As for the hard disk drive, the stored information may include the device identification number, the storage capacity, and the manufacturer. The memory 341 is coupled with a buffer 342 and a chip select circuitry 343 to transfer the ID information data to the computer system through the serial data signal line. The ID information data is outputted serially from the buffer in response to the chip select signal provided from the computer.

Figure 6:
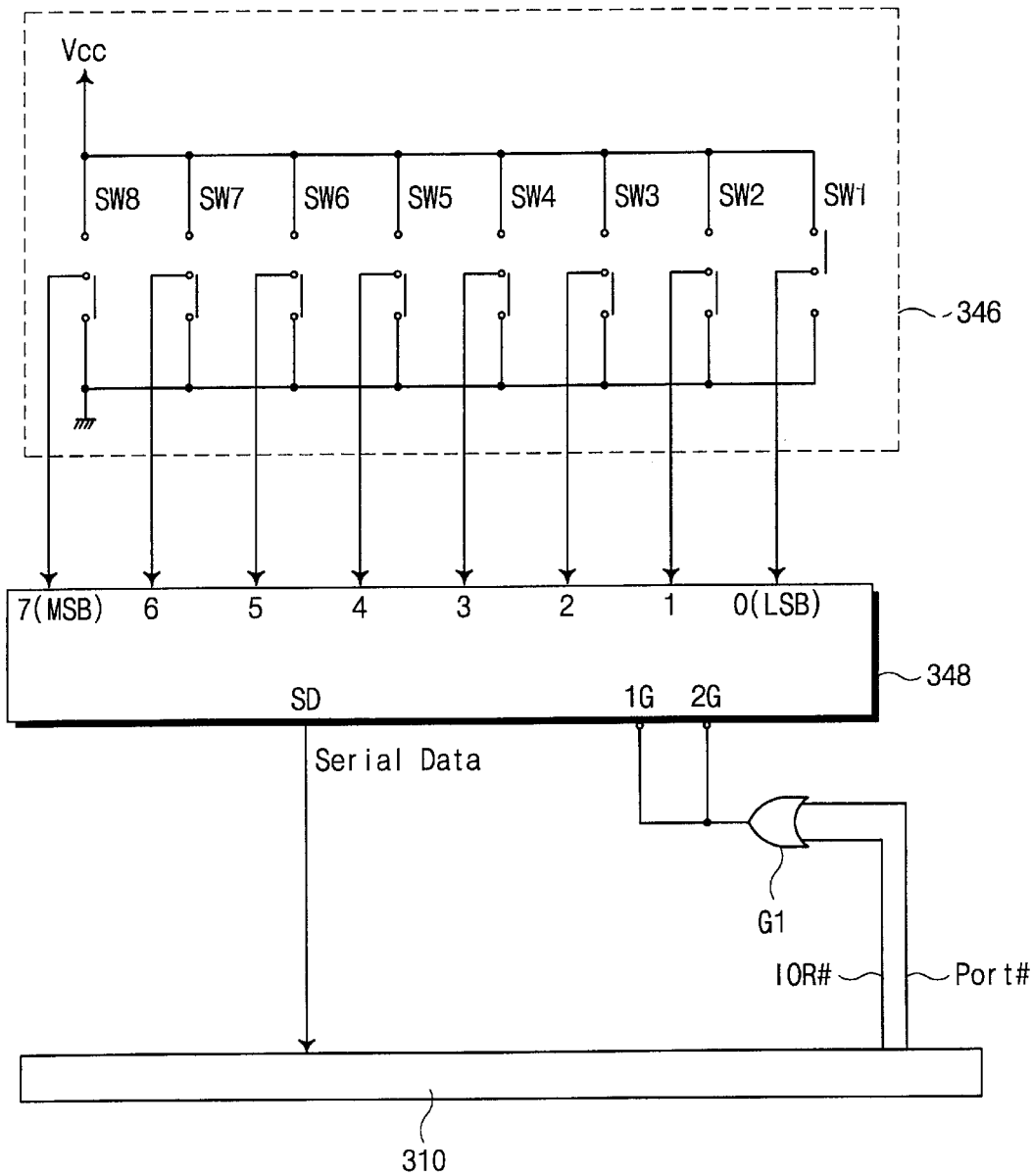
FIG. 6 is a block diagram of another embodiment of the ID information provider shown in FIG. 4.

Further, another embodiment of the ID provider 340 is shown in FIG. 6. The ID provider 340 includes a switch array 346 which selectively outputs digital "1" or "0" voltage level. Preferably, the switch 346 consists of eight slide switches each having movable contact which is manually switchable to an operating voltage Vcc or ground. The outputs of the switches SW1~SW8 are connected to inputs of an inter-integrated circuits serial interface 348. Serial data output SD of the interface circuit 348 is connected with the I/O port of the portable computer through the connector 310 and signal lines are provided with inputs of the interface circuit 348 via an OR gate G1 to supply interrupt signals IOR#, PORT# produced in the portable computer. Thus, the serial interface 348 outputs serial data of the switches SW1~SW8 at the output SD in response to the interrupt signals IOR# and PORT#.

In this arrangement, by manually setting digital "1" or "0" state of the switches SW1~SW8, the combinational output of digital data may constitute information related to the swappable, device. Also, the information includes for example the device identification number, the speed of CD-ROM drive, the storage capacity, and the manufacturer.

The above ID information data is supplied with the portable computer when the computer system is started or requested by a management program during operation. Whenever the ID information is received, the ROM BIOS reads out the ID information data and determines the swappable device to perform device initialization routine based on the ID information. The portable computer system 100 has internal hard disk drive 140, connected with the FDD/IDE controller 130, in which an operating system is stored.

Figure 7:
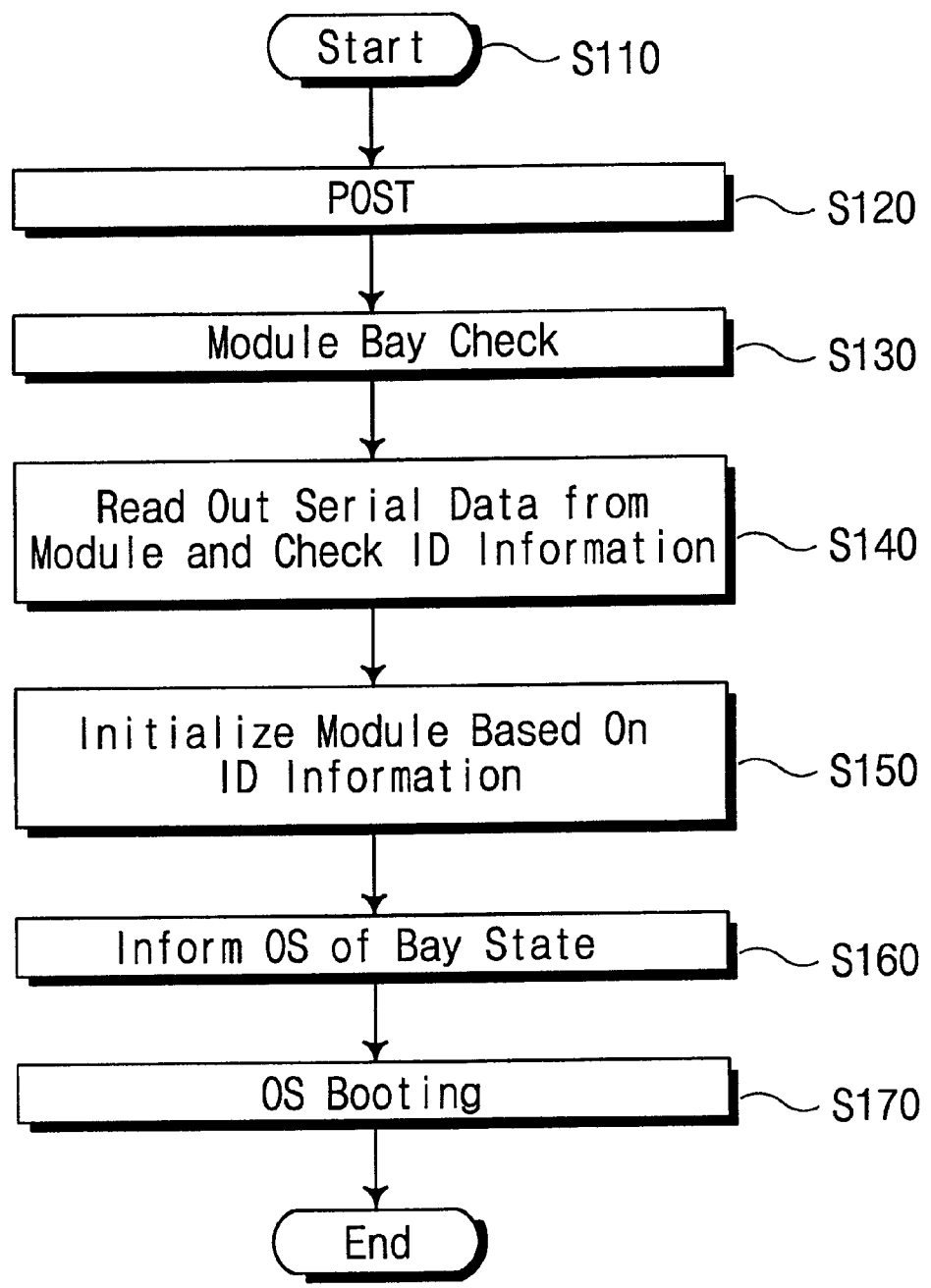
FIG. 7 is a flow diagram depicting a swap identification process in accordance with the invention.

The device identification process performed in the portable computer will be described with reference to FIG. 7. When the portable computer 100 is started at step 110 the POST Power-On Self Test is performed by the BIOS at step 120. After the POST, swap bay checking operation is performed by the BIOS at step 130. When a swappable device is found to be docked in the swap bay, the swappable device generates a read-out command from the memory 341 and the serial data ID information is then supplied to the BIOS at step 140. The BIOS checks the ID information data and determines the swappable device type to perform a device initialization routine S150 based on the information read out at step 140. After completion of the initialization step, the BIOS transfers bay state information to the operating system at step 160. Next, the booting by the operating system is performed at step 170.

Meanwhile, when the computer system is in operation, a module management program is periodically checking the swap bay. When the swappable device is found to leave changed in the swap bay, the device urges the computer system to generate an interrupt signal IOR#,PORT# to read out the serial data SD containing the ID information for the new swappable device. Once the identification process has finished, the initialization routine for the new device is performed to activate the device.

As apparent from foregoing, the identification system of the present invention provides detailed and precise information for driving the swappable device whenever the computer system is booted or the swappable device has changed during the operation of the computer. Thus, it is possible to prevent time loss for individual checking for all swappable devices during the booting. Further, misidentification of a module in a portable computer can be effectively prevented, thereby eliminating malfunction of the computer system due to incorrect resource data.

While the invention has been described in terms of an exemplary embodiment, it is contemplated that it may be practiced as outlined above with modifications within the spirit and scope of the appended claims.

What is claimed is:

1. A computer system, comprising:
    a plurality of swappable devices, each bearing a first plurality of connectors positioned to conduct data reads from corresponding ones of said peripheral devices;
    a portable computer having a swap bay incorporating a second plurality of connectors accommodating insertion of one of said plurality of swappable devices, said second plurality of connectors assisting in the identification of said swappable devices;
    an identification provider borne by each of said plurality of swappable devices and storing specific device information identifying corresponding ones of the swappable devices by manufacturer, model, and capacity, to the portable computer through an input output port;
    a read only memory basic input/output system for reading said device information from said one of said plurality of swappable devices to perform initialization on said plurality of peripheral devices based on the device information when the computer is started and when a module check request signal is made during operation of the computer;
    said identification provider comprising:
        a plurality of digital voltage levels;
        a switch array having switches that selectively output the plurality of digital voltage levels;
        an inter-integrated circuits serial interface connected with the outputs of the switches; and
        an interrupt signal receiving means for enabling the serial interface to output serial data of the switches in response to the interrupt signals fed from the computer.

2. The computer system of claim 1, further comprised of said device information including an identification number representing speed data, storage capacity data, and manufacturer data of said one of said plurality of peripheral devices.

3. The computer system of claim 1, further comprised of said identification provider including a memory coupled with a buffer and a chip select circuitry to transfer the information data to the computer system, said information data outputted serially from the buffer in response to a chip select signal provided from the computer.

4. The computer system of claim 3, wherein said memory includes an electrically erasable programmable read only memory.

5. The computer system of claim 1, wherein said switch array comprises a plurality of slide switches each having movable contact manually switchable to an operating voltage Vcc or ground.

6. The computer system of claim 5, wherein said switch array comprises device information that includes the device identification number, the speed of a compact disk read only memory drive, the storage capacity, and the manufacturer.

7. The computer system of claim 1, wherein said identification of said swappable devices comprises the steps of:
    executing a set of routines stored in a computer's read-only memory that test various system components;
    checking the swap bay, via said connectors, to determine whether a swappable device is docked in the swap bay when the set of routines that test various system components are finished;
    generating a read-out command for a memory of the modular device and reading out device information data stored in the memory;
    determining the swappable device to perform device initialization routine based on the information; and
    transferring bay state information to the operating system.

8. A computer system, comprising:
    a plurality of swappable devices, each bearing a first plurality of connectors positioned to conduct data reads from corresponding ones of said peripheral devices;
    a portable computer having a swap bay accommodating insertion of one of said plurality of swappable devices and a second plurality of connectors positioned to mate with said first plurality of connectors, said second plurality of connectors assisting in the identification of said swappable devices;
    an identification provider borne by each of said plurality of swappable devices and storing specific device information identifying corresponding ones of the swappable devices by manufacturer, model, and capacity, to the portable computer through an input output port;
    a read only memory basic input/output system for reading said device information from said one of said plurality of modular devices to perform initialization on said plurality of peripheral devices based on the device information when the computer is started and when a module check request signal is made during operation of the computer;
    said identification provider comprising:
        a plurality of digital voltage levels;
        a switch array having switches that selectively output the plurality of digital voltage levels;
        an inter-integrated circuits serial interface connected with the outputs of the switches; and
        an interrupt signal receiving means for enabling the serial interface to output serial data of the switches in response to the interrupt signals fed from the computer.

9. The computer system of claim 8, wherein said identification provider comprises:
- a memory;
- a buffer connected to said memory to transfer information to the portable computer; and
- chip select circuitry to transfer information to the portable computer, wherein information is outputted serially from the buffer in response to a chip select signal provided from the portable computer.

10. The computer system of claim 9, wherein said memory comprises an electrically erasable programmable read only memory.

11. The computer system of claim 8, wherein each switch of said switch array comprises a plurality of slide switches each having movable connector manually switchable to an "on" or an "off" state.

12. The computer system of claim 11, wherein the output of digital data comprises said device information.

13. The portable computer of claim 8, wherein said identification of said swappable devices comprises the steps of:
- executing a set of routines stored in a computer's read-only memory that test various system components;
- checking the swap bay, via said optical connectors, to determine whether a swappable device is docked in the swap bay when the set of routines that test various system components are finished;
- generating a read-out command for a memory of the swappable device and reading out device information data stored in the memory;
- determining the swappable device to perform device initialization routine based on the information; and
- transferring bay state information to the operating system.

14. A computer system, comprising:
- an operating system;
- a plurality of swappable devices;
- an identification provider borne by each of said plurality of swappable devices, said identification provider storing specific device information identifying swappable devices by manufacturer, model, and capacity;
- said identification provider further comprising:
  - a plurality of digital voltage levels;
  - a switch array having switches that selectively output the plurality of digital voltage levels;
  - an inter-integrated circuits serial interface connected with the outputs of the switches; and
  - an interrupt signal receiving means for enabling the serial interface to output serial data of the switches in response to the interrupt signals fed from the computer; said identifying swappable devices comprising the steps of:
    - executing a set of routines stored in a computer's read-only memory that test various system components;
    - checking a swap bay to determine whether a swappable device is docked in the swap bay when the set of routines that test various system components are finished;
    - generating a read-out command for a memory of the modular device and reading out device information data stored in the memory;
    - determining the swappable device to perform device initialization routines based on the information; and
    - transferring bay state information to the operating system.

15. The portable computer of claim 14, wherein said identification provider comprises:
- a memory;
- a buffer connected to said memory to transfer information to the portable computer; and
- chip select circuitry to transfer information to the portable computer, wherein information is outputted serially from the buffer in response to a chip select signal provided from the portable computer.

16. The portable computer of claim 15, wherein said memory comprises an electrically erasable programmable read only memory.

17. The computer system of claim 14, wherein each switch of said switch array comprises a plurality of slide switches each having movable connector manually switchable to an "on" or an "off" state.

18. The portable computer of claim 17, wherein the digital data output comprises said device information.

19. A computer system comprising:
- a plurality of swappable devices having different interface levels, each swappable device bearing a first plurality of connectors positioned to conduct data reads from corresponding ones of said peripheral devices;
- a portable computer having a swap bay incorporating a second plurality of connectors accommodating insertion of one of said plurality of swappable devices, said second plurality of connectors assisting in an identification of said swappable devices;
- an identification provider borne by each of said plurality of swappable devices, said identification provider storing specific device information identifying corresponding ones of the swappable devices by manufacture, model, and capacity, to the portable computer through an input/output port;
- a basic input/output system for reading a first device information from a first swappable device to perform initialization based on said first device information, said portable computer being in normal operation afer said initialization is performed and a booting is performed by a operation system;
- a swappable device management system for checking whether said first swappable device is changed to a second swappable device when said portable computer is in normal operation; and
- said basic input/output system for reading a second device information from said second swappable device to perform initialization on said second swappable device based on said second device information and to transfer said operation system device information to said operation system when said portable computer is in normal operation and said first swappable device is changed to said second swappable device during operation of the portable computer.

20. A method for identifying swappable devices of a portable computer through a swap bay, the device identification method comprising the steps of:
- executing a set of routines stored in a computer's read-only memory that test various system components;
- checking the swap bay to determine whether a swappable device is docked in the swap bay when the set of routines that test various system components are finished;
- generating a read-out command for a memory of the swappable device and reading out device information data stored in the memory;
- determining the modular device to perform device initialization routine based on the information;

transferring bay state information to the operating system to perform normal operation of said portable computer;

checking whether said swappable device is changed to a second swappable device during normal operation of said portable computer;

perform device initialization routine based on a second information if said second swappable device after said swappable device has been changed to second swappable device during normal operation; and transferring bay state information to the operating system transferring a second information to said operation system.

21. The method for identifying peripheral devices as claimed in claim 20, said device information data includes a device identification number, speed of compact disk read only memory drive, storage capacity, and manufacturer.

* * * * *